United States Patent [19]
Caccamo

[15] 3,736,688
[45] June 5, 1973

[54] MOUNTING MEANS FOR ANIMATING EXISTING DECOY

[76] Inventor: Samuel Caccamo, 1102 Camino Pablo, San Jose, Calif. 95125

[22] Filed: March 18, 1971

[21] Appl. No.: 125,595

[52] U.S. Cl. .......................................... 43/3, 46/124
[51] Int. Cl. ............................................. A01m 31/06
[58] Field of Search ........................... 43/3, 2; 46/124

[56] References Cited

UNITED STATES PATENTS

| | | | |
|---|---|---|---|
| 2,483,680 | 10/1949 | Timm et al. | 43/3 |
| 1,083,882 | 1/1914 | Hindmarsh | 43/3 |
| 278,461 | 5/1883 | Screvin | 43/2 X |
| 2,331,421 | 10/1943 | Redhead | 43/3 UX |
| 2,747,316 | 5/1956 | Benedetto | 43/3 |
| 2,441,753 | 5/1948 | Carpenter | 43/3 |
| 2,711,608 | 6/1955 | Fulster | 43/3 |

*Primary Examiner*—Samuel Koren
*Assistant Examiner*—J. F. Pitrelli
*Attorney*—Leslie M. Hansen

[57] ABSTRACT

A means for animating an existing decoy on the end of a flexible arm for up and down movement therewith as well as pivotal movement into the direction of the wind and rockability from side to side about a horizontal axis upon a releasable attaching means so mounted on the end of the flexible arm.

5 Claims, 6 Drawing Figures

PATENTED JUN 5 1973 3,736,688
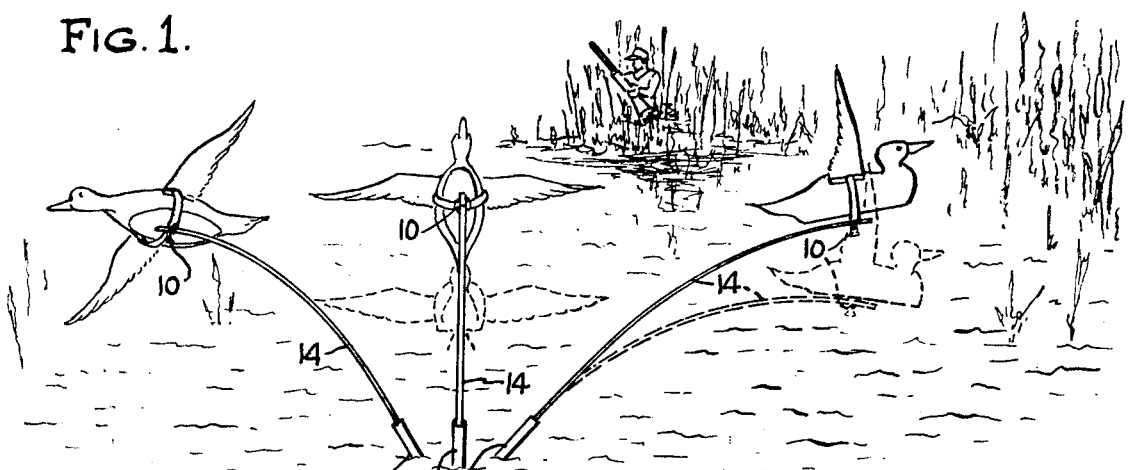
FIG.1.
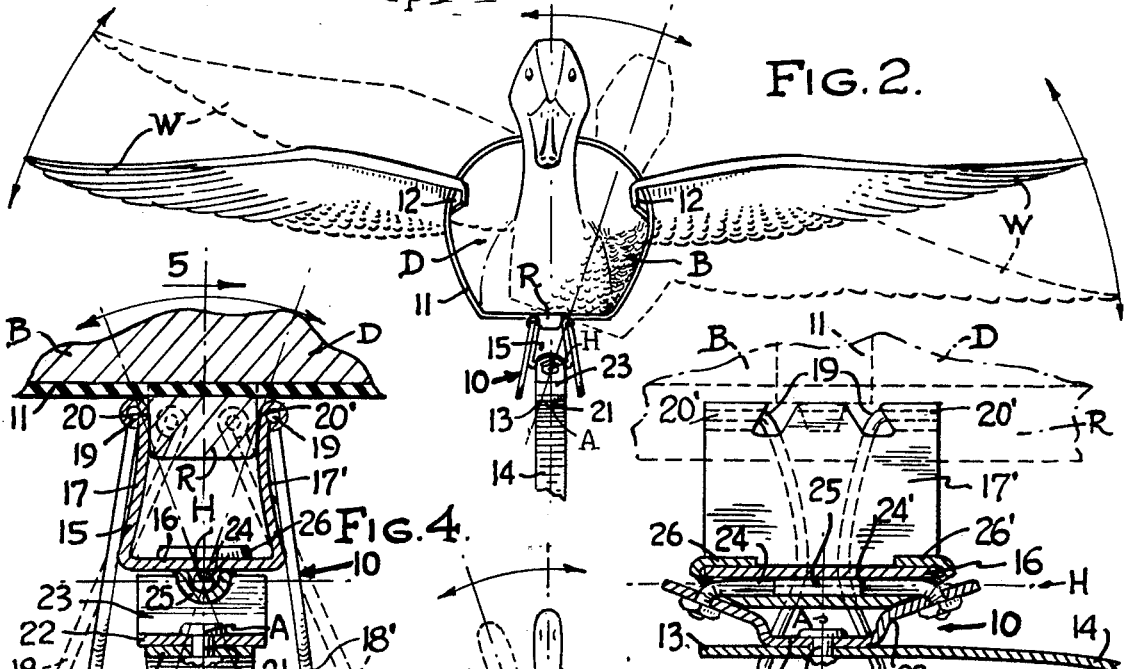
FIG.2.
FIG.4.
FIG.5.
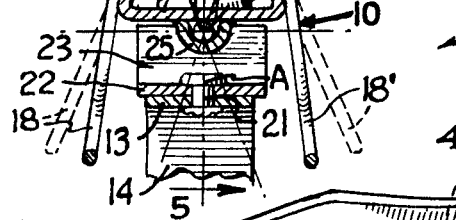
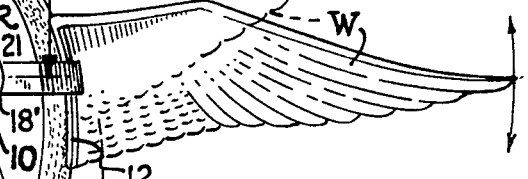
FIG.3.
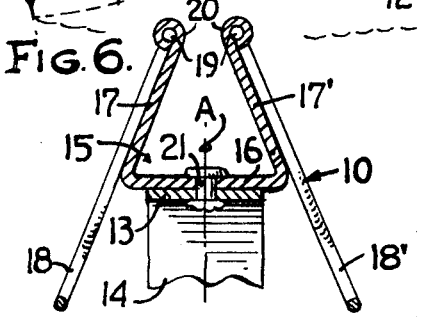
FIG.6.
INVENTOR:
Samuel Caccamo
BY
Leslie M. Hansen
HIS ATTORNEY.

MOUNTING MEANS FOR ANIMATING EXISTING DECOY

BACKGROUND OF THE INVENTION

This invention relates to waterfoul and the like, decoys and more particularly to means for mounting such decoys in a manner to achieve animation thereof during use.

Decoys as such are old and well known. The present invention is intended for use in combination with any of the known types of decoys of ducks, geese and like fowl. The present invention is most suitable for use in combination with existing decoys of either wooden, plastic or rubber third dimensional characteristics although single panel types may also be benefited by the mounting thereof on the animating supporting means of the present invention.

As examples of prior types of decoys, U.S. Pat. No. 2,535,445 of Dec. 26, 1950 to Miller et al. shows the single panel type; U.S. Pat. No. 2,747,316 dated May 29, 1956 granted to Benedetto shows the wooden or plastic, three dimensional type decoy. Benedetto and Miller also show wing attachments for their particular forms of decoy.

U.S. Pat. No. 2,441,753 to Carpenter on May 18, 1948 shows a single panel type decoy mounted like a weather vane on a vertical shank of a stake for turning with the wind about a vertical axis. This pivot shank theory is also shown in U.S. Pat. No. 2,711,608 which issued to Fulster June 28, 1955. In addition thereto Fulster provides a rubber grommet through the hollow shell back of the decoy to enable rockability of the decoy in any direction relative to horizontal.

In March of 1883 U.S. Pat. No. 278,461 issued to Sparkman R. Screven for a toy bird with movable wings, the bird being fixedly secured to one end of a spring arm having its opposite end anchorable to facilitate up and down movement of the bird during flexing of the spring arm.

The present invention has as its principle object the provision of a simple yet effective means for mounting a conventional and existing decoy in a manner to achieve animated action thereof in accordance with various wind conditions. This object contemplates providing such decoy with fully spread wings and a spring clip mounting pivotally connected to one end of a flexible arm such as to achieve turnability of the decoy about a vertical axis.

It is another object to provide such a spring clip mounting for rockability of the decoy about a horizontal axis. This object further includes the provision of the dual action of turnability about a vertical axis as well as rockability about a horizontal axis relative to the flexible support arm and decoy.

These and other objects and advantages of the present invention will become apparent in the following description the light of the drawing in which:

FIG. 1 is a panoramic view of a duck blind having decoys mounted in accordance with the present invention;

FIG. 2 is a front elevation of a decoy at larger scale on a mount of the present invention;

FIG. 3 is a bottom plan of FIG. 2;

FIG. 4 is a fragmentary cross section through FIG. 3 taken along line 4—4 thereof and at larger scale;

FIG. 5 is a section through the decoy mount only taken along line 5—5 in FIG. 4; and FIG. 6 is a cross section through a simplified form of the embodiment of the mount including the present invention.

Referring to the drawing the mounting 10 forming the embodiment of the present invention is shown applied to a conventional decoy D available for duck hunters on the open market. Such decoy D may be of the solid wooden variety or of rubber and/or plastic so as to be floatable in a body of water. Such decoys D usually have a keel-like rib R formed on its underside through which an anchor line may be strung or connected. Such decoys D usually depict a sitting duck with wings drawn against the body B. For purpose of the present invention a pair of fully spread wings W are applied to the sides of the body B preferably by a strap or endless rubber band 11 strung through the keel rib R and a flange 12 on each wing W for quickly applying the wings W to the body B in spread condition as shown.

The decoy D with spread wings is secured to one end 13 of a long arm or strip of flexible material 14 by the mounting 10. The flexible arm 14 is adapted to have its opposite end anchored in earth or in a length of pipe P. The pipe P or end of the strap 14 is driven stake-like into the bottom of a pond adjacent a duck blind as illustrated in FIG. 1. The arrangement is such that the decoy will bob up and down at the end of the flexible arm 14 as the latter flexes due to wind action against the spread wings W attached to the decoy.

In accordance with the present invention the flexible arm 14 is preferably a length of spring steel strap iron in combination with the mounting means 10 of the present invention in a manner to achieve movability of the decoy relative to the free end of the flexible arm 14.

In the preferred embodiment the mounting means 10 comprises a U shaped spring clip 15 provided with a substantially flat bight portion 16 formed integrally with a pair of flexible arms 17—17'.

Each of the flexible arms 17—17' of the spring clip 15 is provided with a handle 18—18', respectively, hingedly connected as at 19 to the upper ends 20—20' of the respective arm 17 and 17'. These handles 18[' are disposed to hang down parallel the respective arm 17—17' and to engage the juncture thereof with the bight portion 16 to effect a fulcrum action therewith. A person upon gripping of the two handles 18—18' between one's fingers, can flex the flexible arms 17 and 17' away from each other cross wise the spring clip 15 to enable the upper ends 20—20' to grippingly engage the keel-like rib R on the decoy D.

The mounting means 10 is constructed for pivotal connection to the free end 13 of the flexible arm 14 for rotary movement about a vertical axis —A—. In its simplest form (FIG. 6) this pivotal connection is shown as a rivet 21 or the like extending through the relatively flat bight portion 16 of the spring clip 15.

In a more sophisticated form (FIGS. 4 and 5) the vertical pivotal axis A is provided by the rivet 21 extending through the base 22 of a clevis 23 having its legs 23—23' perforated to receive hinge pins 24—24', respectively. These hinge pins 24—24' extend into a hinge barrel formation 25 having its ends 26—26' crimped around the bight portion 16 of the spring clip 15. The hinge pins 24—24' are thus aligned and confined in the hinge barrel 25 parallel to the long axis of the spring clip 15, i.e. transversely of the operable jaws 17—17' thereof. By this arrangement the spring clip 15 is rockable about a horizontal axis H to facilitate rockability of the decoy D relative to the clevis 23.

From the foregoing it will be appreciated that the mounting 10 facilitates rockability of the decoy D about the horizontal axis H as depicted in FIGS. 2 and 4 of the drawing. By the same token the mounting means 10 facilitates rotary swinging of the decoy D about the vertical axis A as depicted in FIG. 3 of the drawing. With the combined action afforded by the vertical and horizontal axis of the mounting means 10 the decoy D is enabled to achieve an animated action against and into the wind. This coupled with the up and down bobbing of the decoy at the decoy at the end of the flexible arm 14 attains animation simulating the natural action of a bird over a pond adjacent a blind as illustrated in FIG. 1.

The spring clip 15 affords a quick and effective means of attaching an existing decoy to the mounting means 10. Moreover, the wings W being merely strapped to the existing decoy the entire assembly can be quickly and easily taken apart and the parts stored in the blind or carried to one's vehicle for transport to storage until further required.

While I have described my new mounting means for animating existing decoys in specific detail it will be appreciated that the same may be altered, varied and/or modified without departing from the spirit or scope of the invention therein as set forth in the following claims:

What I claim as new and desire to protect by Letters Patent is:

1. The combination with a decoy having an outwardly projecting rib-like portion on its lower surface and a pair of wings attachable to the decoy in spread wing condition, of a mounting means for releasably attaching such decoy to the free end of a flexible arm having its opposite end anchorable in a pond and the like of a duck blind, said mounting means comprising:
   a. a spring clip connected to the free end of such flexible arm;
   b. a pair of openable jaws on said spring clip; and
   c. handle means for opening the jaws of said spring clip and for releasing the same for gripping relation to the rib-like portion of said decoy.

2. The mounting means of claim 1 in which said spring clip comprises a U-shaped member forming said openable jaws.

3. The mounting means of claim 2 in which the U-shaped spring clip has its bight portion pivotally connected to the free end of such flexible arm facilitating swinging movement of a decoy gripped by the jaws of said spring clip about a vertical axis.

4. The mounting means of claim 2 including:
   a. a clevis member having its base connected to the free end of such flexible arm;
   b. a pair of hinge pins on the arms of said clevis member;
   c. a hinge barrel secured to the bight portion of said U-shaped spring clip for confining said hinge pins in axial alignment in relation thereto facilitating rockability of said spring clip and the decoy gripped thereby about a horizontal axis.

5. The mounting means in accordance with that of claim 4 in which said clevis member has its base pivotally connected to the free end of the flexible arm to facilitate swinging movement of the rockable spring clip and decoy gripped thereby about a vertical axis.

* * * * *